(12) United States Patent
Hirairi (10) Patent No.: US 7,840,629 B2
(45) Date of Patent: Nov. 23, 2010

(54) METHODS AND APPARATUS FOR PROVIDING A BOOTH MULTIPLIER

(75) Inventor: Koji Hirairi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1104 days.

(21) Appl. No.: 11/509,492

(22) Filed: Aug. 24, 2006

(65) Prior Publication Data

US 2007/0203962 A1      Aug. 30, 2007

Related U.S. Application Data

(60) Provisional application No. 60/777,607, filed on Feb. 28, 2006.

(51) Int. Cl.
G06F 7/52   (2006.01)
G06F 7/38   (2006.01)

(52) U.S. Cl. .................. 708/628; 708/625; 708/490

(58) Field of Classification Search ......... 708/625–632, 708/490, 503
See application file for complete search history.

(56) References Cited

U.S. PATENT DOCUMENTS

| 6,301,599 | B1 * | 10/2001 | Chehrazi et al. ............ 708/628 |
| 6,622,154 | B1 | 9/2003 | Hayashi et al. |
| 6,877,022 | B1 | 4/2005 | Toyonoh et al. |
| 7,024,445 | B2 * | 4/2006 | Qi ............................. 708/628 |
| 7,272,624 | B2 * | 9/2007 | Belluomini et al. ......... 708/628 |
| 2003/0120694 | A1 * | 6/2003 | Qi ............................. 708/628 |
| 2005/0144211 | A1 * | 6/2005 | Simkins et al. ............. 708/490 |

OTHER PUBLICATIONS

Ercegovac et al.; "Digital Arithmetic;" published 2004 by Elsevier Science (USA); pp. 139-151, 197-205.
Tadayoshi Enomoto; "CMOS VLSI Circuits;" published Oct. 30, 1996 by Baihu-kan; p. 161.

* cited by examiner

Primary Examiner—Lewis A Bullock, Jr.
Assistant Examiner—Joseph Kelly
(74) Attorney, Agent, or Firm—Matthew B. Dernier, Esq.; Gibson & Dernier LLP (57) ABSTRACT

Methods and apparatus for converting a radix 2 multiplier to respective groups of radix 4 encoded bits representing numbers of the group consisting of −2, −1, 0, 1, 2, wherein the set of encoded bits includes: a first bit that is true when the associated number is 2, a second bit that is true when the associated number is −2, a third bit that is true when the associated number is either negative or zero, and a fourth bit that is true when the associated number has an absolute value of 1.

19 Claims, 7 Drawing Sheets

| Yi Yj Yk | encoded number | abs_1 | negative_or_zero | positive_2 | negative_2 |
|---|---|---|---|---|---|
| 0 0 0 | 0 | 0 | 0 | 0 | 0 |
| 0 0 1 | 1 | 1 | 0 | 0 | 0 |
| 0 1 0 | 1 | 1 | 0 | 0 | 0 |
| 0 1 1 | 2 | 0 | 0 | 1 | 0 |
| 1 0 0 | -2 | 0 | 1 | 0 | 1 |
| 1 0 1 | -1 | 1 | 1 | 0 | 0 |
| 1 1 0 | -1 | 1 | 1 | 0 | 0 |
| 1 1 1 | 0 | 0 | 1 | 0 | 0 |

METHODS AND APPARATUS FOR PROVIDING A BOOTH MULTIPLER

CROSS REFERENCE TO RELATED APPLICATION

This application claims the benefit of U.S. Provisional Patent Application No. 60/777,607, filed Feb. 28, 2006, entitled "Methods And Apparatus For Providing A Booth Multipler," the entire disclosure of which is hereby incorporated by reference.

BACKGROUND OF THE INVENTION

The present invention relates to methods and apparatus for multiplying two binary numbers using a Booth multiplier.

Many of the processes performed by information handling systems and the like involve the multiplication of binary numbers. In a multiplication function, there exists a multiplicand and a multiplier. As is well known in the art, binary numbers are multiplied through a process of multiplying the multiplicand by the first bit of the multiplier. Next, the multiplicand is multiplied by the second bit of the multiplier, shifting the result one digit and adding the products. This process is continued until each bit of the multiplier has been multiplied by the multiplicand.

Each of the products produced by multiplying the multiplicand by a bit of the multiplier produces a number which is referred to as a partial product. The resulting product is formed by accumulating the partial products propagating the carries from the rightmost columns to the left. This process is referred to as partial product accumulation. Although this process works well for its intended purpose, it has a significant drawback in that in order to implement this process utilizing hardware, a significant number of logic gates and other circuitry are required. As a result, implementing this process with hardware may be cost prohibitive and may result in very slow processing speeds, especially for large bit numbers.

In order to speed up the process by decreasing the number of partial products generated during the multiplication of the multiplier binary number and the multiplicand binary number, some known multipliers may employ a Booth encoding algorithm or method. In order to reduce the number of partial products, a known Booth encoding algorithm may recode a radix-2 multiplier Y into a radix-4 multiplier Z with an encoded digital set, $\{-2, -1, 0, 1, 2\}$, such that the number of partial products may be reduced by one half. Booth multipliers typically employ encoders and selectors. The encoders convert respective groups of radix 2 bits of the multiplier into radix 4 encoded bits. the selectors operate as multiplexers, where each selector receives a respective group of radix 2 bits of the multiplicand and the groups of radix 2 bits of the multiplier are used as selector bits. The aggregate of the outputs from the selectors for a given group of radix 2 bits of the multiplier results in a partial product.

While this algorithm allows for a reduction of the number of partial products using a redundant number system, the encoder and selector circuits of the known Booth multiplier circuits require a significant number of logic gates to carry out their functions. (Some examples of known Booth encoders and selectors will be discussed in more detail herein below.) This can significantly delay signal propagation through the multiplier. There is a need, however, for a new Booth multiplier that enjoys a lower propagation delay as compared with conventional implementations.

SUMMARY OF THE INVENTION

In accordance with one or more embodiments of the present invention, methods and apparatus according to the present invention may provide for: converting a radix 2 multiplier to respective groups of radix 4 encoded bits representing numbers of the group consisting of $-2, -1, 0, 1, 2$, wherein the set of encoded bits includes: a first bit that is true when the associated number is 2, a second bit that is true when the associated number is $-2$, a third bit that is true when the associated number is either negative or zero, and a fourth bit that is true when the associated number has an absolute value of 1.

The methods and apparatus may also provide for producing the first, second, third and fourth bits in accordance with the following truth table:

| yi | yj | yk | $1^{st}$ bit | $2^{nd}$ bit | $3^{rd}$ bit | $4^{th}$ bit |
|----|----|----|-----|-----|-----|-----|
| 0 | 0 | 0 | 0 | 0 | 0 | 0 |
| 0 | 0 | 1 | 0 | 0 | 0 | 1 |
| 0 | 1 | 0 | 0 | 0 | 0 | 1 |
| 0 | 1 | 1 | 1 | 0 | 0 | 0 |
| 1 | 0 | 0 | 0 | 1 | 1 | 0 |
| 1 | 0 | 1 | 0 | 0 | 1 | 1 |
| 1 | 1 | 0 | 0 | 0 | 1 | 1 |
| 1 | 1 | 1 | 0 | 0 | 1 | 0 |

The methods and apparatus may also provide for converting respective groups of three bits of the multiplier into the encoded bits, except for a last one of the groups which receives includes two bits of the multiplier and a null bit, wherein: the multiplier includes bits $y0, y1, y2, y3, \ldots yN-1$; a first group of three bits of the multiplier includes $y0, y1, y2$; a second group of three bits of the multiplier includes $y2, y3, y4$; and any further groups of three bits of the multiplier includes bits in accordance with the pattern established by the above convention.

The methods and apparatus may also provide for receiving a respective group of encoded bits and a respective group of bits of the multiplicand; and producing a respective bit of a partial product.

The methods and apparatus may also provide for: receiving a respective group of two bits of the multiplicand, Ai, Aj and a respective group of encoded bits, Bi; and producing a bit, Si, of a partial product in accordance with the following Boolean expression: Si=(B1 !AND Aj) !AND (B2 !AND Aj) !AND (B4 !AND (B3 XOR Ai)). For example, the multiplicand may include bits $A0, A1, A2, A3, \ldots AN-1$; a first group of two bits of the multiplicand consists of bits $A0, A1$; a second group of two bits of the multiplicand consists of bits $A1, A2$; a third group of two bits of the multiplicand consists of bits $A2, A3$; and any further groups of two bits of the multiplicand consists of bits in accordance with the pattern established by the above convention.

The methods and apparatus may also provide for assembling an aggregate of the bits Si for a given group of encoded bits to produce a partial product of a product of the multiplier and the multiplicand. In addition, the methods and apparatus may also provide for summing the partial products to produce the product of the multiplier and the multiplicand.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
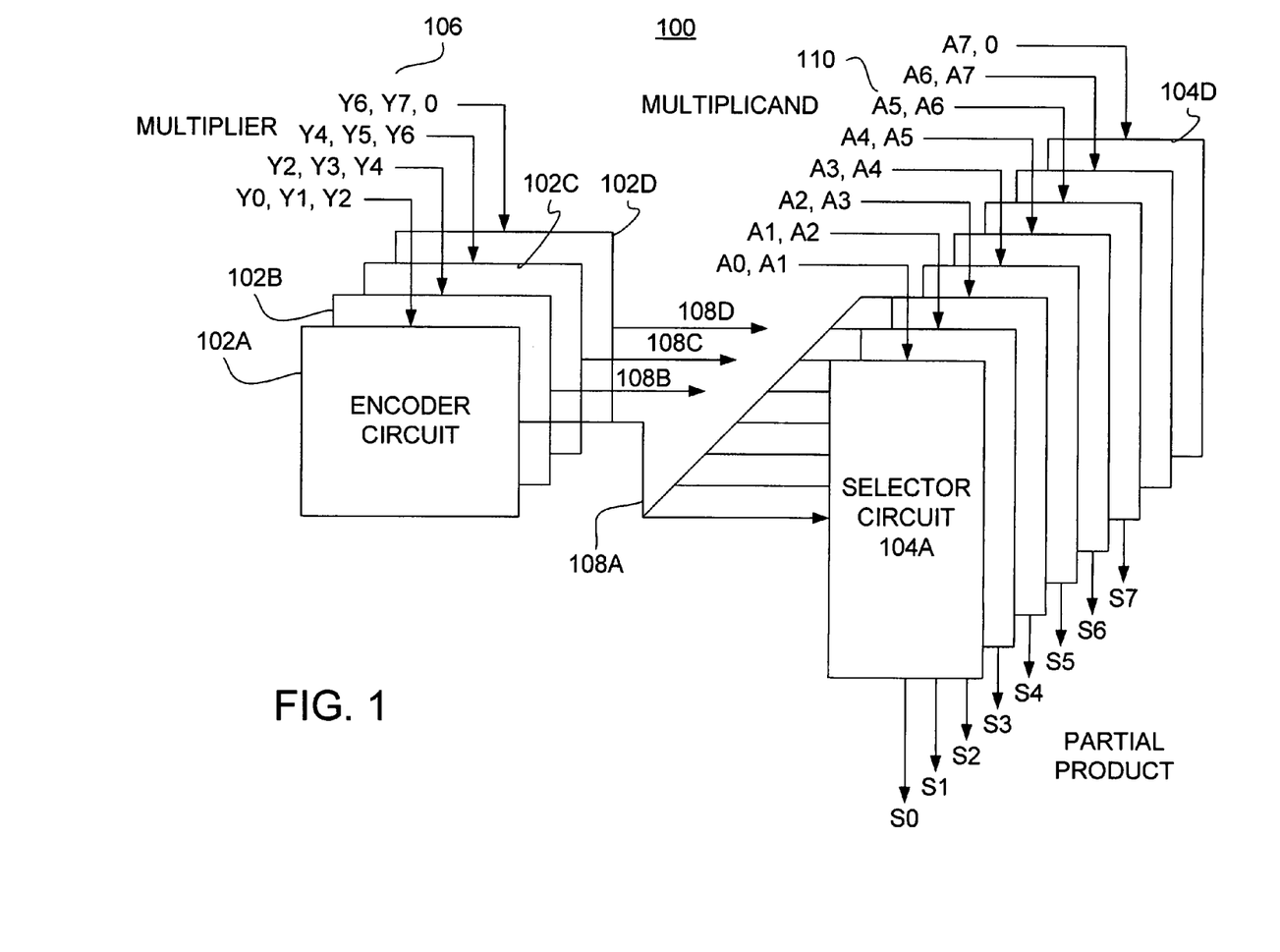
FIG. 1 is a block diagram of a multiplier circuit operable to produce partial products in connection with the multiplication of two binary numbers in accordance with one or more embodiments of the present invention.

With reference to the drawings, wherein like numerals indicate like elements, there is shown in FIG. 1 a block diagram of a multiplier circuit 100 operable to produce partial products in connection with the product of two binary numbers in accordance with one or more embodiments of the present invention. The circuit 100 includes one or more encoder circuits 102 (four encoder circuits being shown for purposes of illustration) and a plurality of selector circuits 104 (eight being shown for purposes of illustration).

The encoder circuits 102 are each preferably operable to convert respective groups of bits, Yi, 106 of a radix 2 binary number to respective groups of encoded bits, Bi, on line 108 representing radix 4 numbers. In particular, the encoded bits on the respective lines 108A-D represent numbers of the group consisting pf $-2, -1, 0, 1, 2$. In a preferred embodiment, each encoder circuit 102 receives a respective group of three bits of the radix 2 multiplier number to produce four radix 4 encoded bits on line 108. Further details in connection with the inputs and outputs of the encoder circuits 102 will be discussed later in this description.

The selector circuits 104 are each preferably operable to receive the respective groups of encoded bits on lines 108 and to receive a group of bits 110 of the multiplicand in order to produce a respective bit of a partial product of the multiplier and the multiplicand. In a preferred embodiment, each selector circuit 104 receives the group of encoded bits from a given encoder circuit 102 over a respective line 108 and uses same to manipulate the given group of bits 110 of the multiplicand to produce a given bit Si of the partial product. In the example illustrated in FIG. 1, four respective groups of encoded bits are input into each of the plurality of selector circuits 104 such that each selector circuit 104 produces a given bit Si in each of four partial products. A summation of the partial products is the product of the multiplier and the multiplicand.

In a preferred embodiment, the circuit 100 may include N/2 encoder circuits 102, where N is a number of bits in the multiplier. Thus, for example, four encoder circuits 102A, 102B, 102C and 102D may be employed for an 8-bit multiplier Y0, Y1, Y2, Y3, Y4, Y5, Y6, Y7. Further, each encoder circuit is preferably operable to receive a different group of three bits, (Yi, Yj, Yk) 106 of the multiplier. For example, the encoder circuit 102A may be operable to receive bits Y0, Y1, Y2 of the multiplier. The encoder circuit 102B may be operable to receive bits Y2, Y3, Y4 of the multiplier. The encoder 102C may be operable to receive bits Y4, Y5, Y6. And the encoder circuit 102D may be operable to received bits Y6, Y7 and a null bit, such as 0.

In a preferred embodiment, the system 100 includes N selector circuits 104, where N is a number of bits in the multiplicand. In this example, the multiplicand is an 8-bit number A0, A1, A2, A3, A4, A5, A6, A7. Each selector circuit 104 is preferably operable to receive a different group of two bits 110 of the multiplicand, except for a last one of the selector circuits 104H, which receives one bit of the multiplicand and a null bit, such as zero. For example, a first selector circuit 104A may receive bits A0, A1 of the multiplicand. A second selector circuit 104B may receive bits A1, A2 of the multiplicand. The selector circuit 104C may receive bits A2, A3 of the multiplicand. And further selector circuits 104 may receive bits in accordance with the pattern established thus above, except for the last selector circuit 104H, which may receive bits A7, 0.

Those skilled in the art will appreciate from the description herein that different numbers of encoder circuits 102 and selector circuits 104 may be employed depending on the design criteria of the system 100. For example, a single encoder circuit 102 may be employed which receives successive groups of bits 106 of the multiplier in order to produce successive groups of encoded bits on line 108 such that the plurality of selector circuits 104 may successively receive the respective groups of encoded bits and produce the respective partial products. Similarly, a single selector circuit 104 may be employed, which receives successive groups of bits 110 of the multiplicand in order to produce the respective bits Si of the partial products. In view of the discussion herein, a skilled artisan is capable of making and using various embodiments of the system 100 by employing different numbers of encoder circuits 102 and selector circuits 104 in order to produce the partial products described above and hereinbelow.

Figure 2:
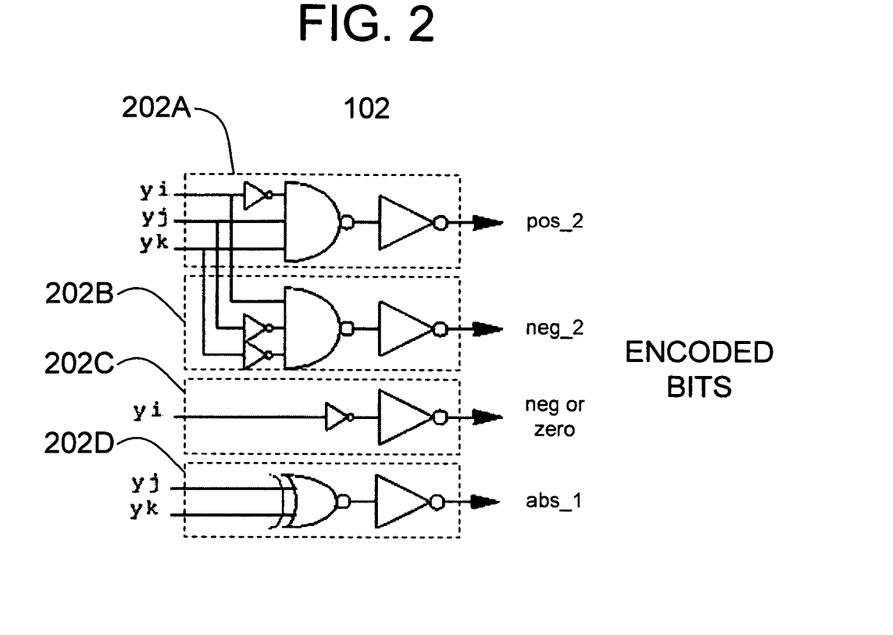
FIG. 2 is a detailed circuit diagram of a radix 4 encoder circuit suitable for implementing one or more circuit blocks of the multiplier circuit of FIG. 1.
Figure 3:
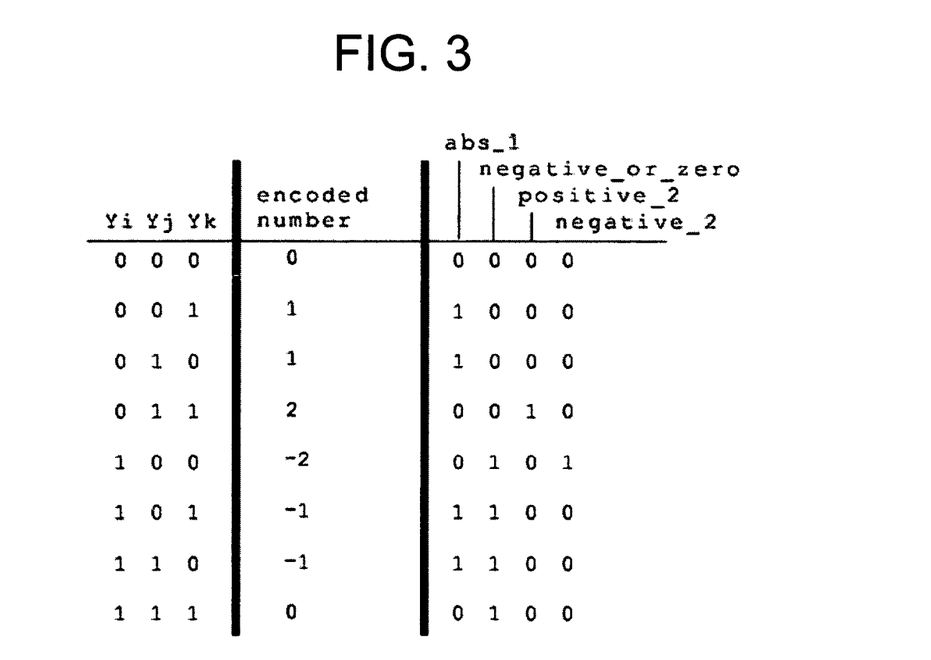
FIG. 3 is a truth table illustrating the operation of the encoder circuit of FIG. 2 in converting radix 2 binary number groups into radix 4 encoded numbers and also into Booth encoded bits.

Reference is now made to FIGS. 2 and 3, which are a detailed circuit diagram of a circuit suitable for implementing the encoder circuit 102 of FIG. 1, and a truth table illustrating the operation of the encoder circuit 102, respectively. The encoder circuit 102 includes a plurality of logic gates operable to convert a group of three bits Yi, Yj, Yk of the multiplier into a group of encode bits labeled pos_2, neg_2, neg or zero, abs_1. In a preferred embodiment, the encoder circuit 102 includes a first circuit 202A, a second circuit 202B, a third circuit 202C, and a fourth circuit 202D. The first circuit 202A is preferably operable to receive the Yi, Yj, Yk bits of the multiplier and to produce the first bit, pos_2, of the encoded bits. The second circuit 202B is preferably operable to receive the Yi, Yj, Yk bits of the multiplier and to produce a second bit, neg_2, of the encoded bits. The third circuit 202C is preferably operable to receive the Yi bit and to produce a third bit neg or zero, of the encoded bits. And the fourth circuit 202D is preferably operable to receive the Yj, Yk bits of the multiplier and to produce a fourth bit, abs_1 of the encoded bits.

With reference to FIG. 3, the encoder circuit 102 preferably includes suitable logic gates interconnected in order to produce encoded bits in accordance with the illustrated truth table. In particular, the first encoded bit pos_2 is preferably true when the radix 4 representation of the group of three bits of the multiplier is +2. The second encoded bit neg_2 is preferably true when the radix 4 representation of the group of three bits of the multiplier is −2. The third encoded bit neg or zero is preferably true when the radix 4 representation of the group of three bits of the multiplier is either negative or zero. And the fourth encoded bit abs_1 is preferably true when the radix 4 representation of the group of three bits of the multiplier has an absolute value of 1.

It is noted that the specific circuit implementation of the encoder circuit 102 shown in FIG. 2 is given by way of illustration only. Those skilled in the art will appreciate that many modifications and variations on the specific logic gates and their interconnections may be made without departing from the spirit and scope of the present invention.

Figure 4:
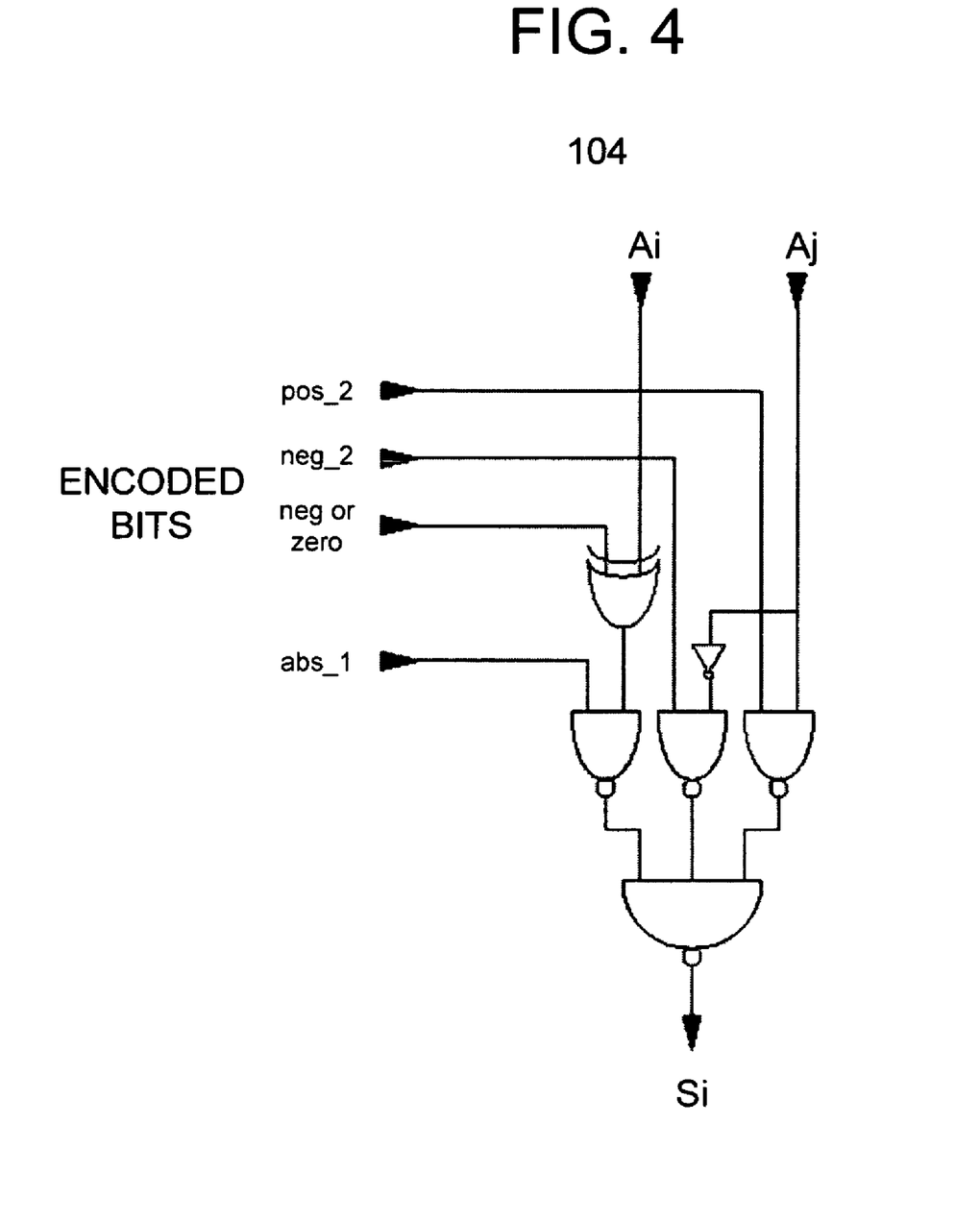
FIG. 4 is a detailed circuit diagram of a selector circuit suitable for implementing one or more circuit blocks of the multiplier circuit of FIG. 1.

Reference is now made to FIG. 4, which is a detailed circuit diagram of a circuit suitable for implementing the selector circuit 104 of FIG. 1. The selector circuit 104 includes a plurality of logic gates interconnected in such a way as to manipulate a group of bits 110 of the multiplicand, Ai, Aj, using the encoded bits from the encoder circuit 102 in order to produce a respective bit Si of a partial product of the multiplier and multiplicand. In accordance with a preferred embodiment, the logic gates are operable to produce the output bit Si in accordance with the following Boolean expression: Si=(B1 !AND Aj) !AND (B2 !AND Aj) !AND (B4 !AND (B3 XOR Ai)), where Bi are the first, second, third and fourth encoded bits.

It is noted that the specific circuit implementation of the selector circuit 104 shown in FIG. 4 is given by way of illustration only. Those skilled in the art will appreciate that many modifications and variations on the specific logic gates and their interconnections may be made without departing from the spirit and scope of the present invention.

Figure 5:
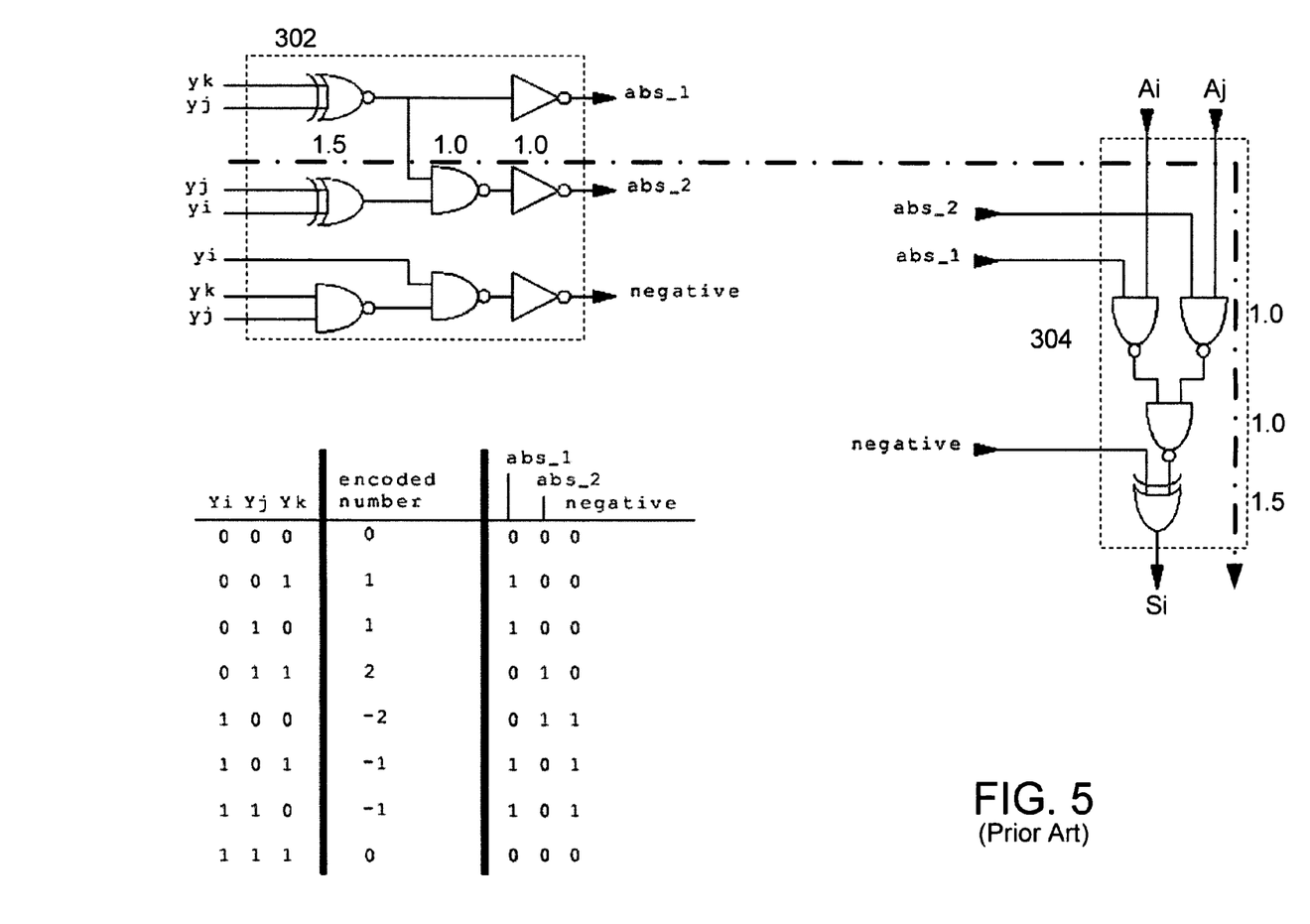
FIG. 5 is a combined detailed circuit diagram and truth table illustrating a prior art Booth encoder/selector circuit and signal propagation delays therethrough.

Reference is now made to FIGS. 5-8, which illustrate signal propagation delays through multiplier circuits of the prior art in comparison with signal propagation delays through the embodiment of the present invention illustrated in FIGS. 1-4. In particular, FIG. 5 illustrates a known Booth encoder circuit 302 and selector circuit 304, where the illustrated truth table indicates the circuit operation of the encoder circuit 302. A worst case signal propagation delay through the encoder circuit 302 and the selector circuit 304 may be evaluated by considering units of delay through each of a plurality of logic gates. For purposes of discussion, it is assumed that an XOR gate has a propagation delay of 1.5 (with significant fan out load), an AND gate has a signal propagation delay of 1.0, and inverter gate has a signal propagation delay of 1.0. A worst case signal propagation delay through the circuit of FIG. 5 is thus 1.5+1.0+1.0+1.0+1.5=7.0.

Figure 6:
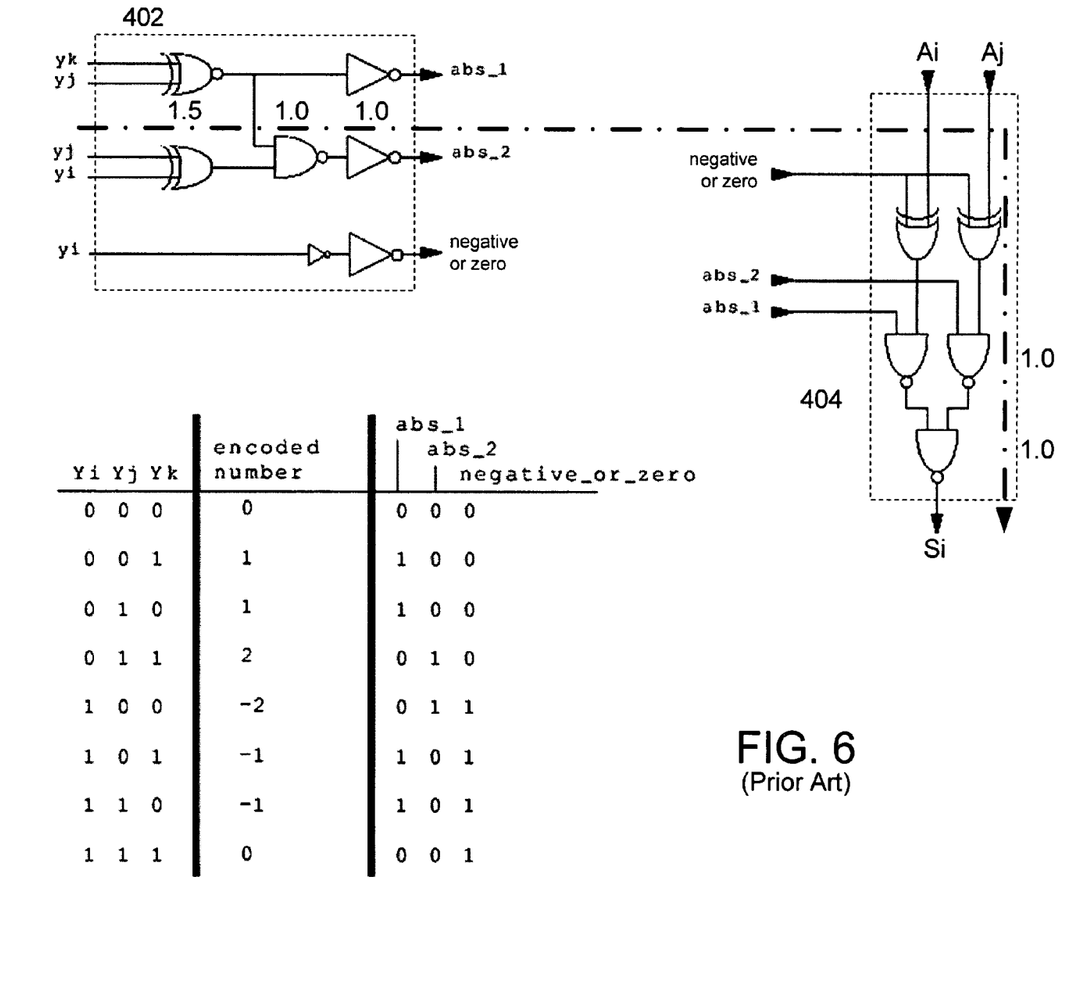
FIG. 6 is a combined detailed circuit diagram and truth table illustrating a further prior art Booth encoder/selector circuit and signal propagation delays therethrough.

Reference is now made to FIG. 6, which illustrates another known Booth encoder circuit 402 and selector circuit 404, where the truth table illustrates the detailed circuit operation of the encoder circuit 402. A worst case signal propagation delay through the encoder circuit 402 and the selector circuit 404 is 1.5+1.0+1.0+1.0+1.0=5.5.

Figure 7:
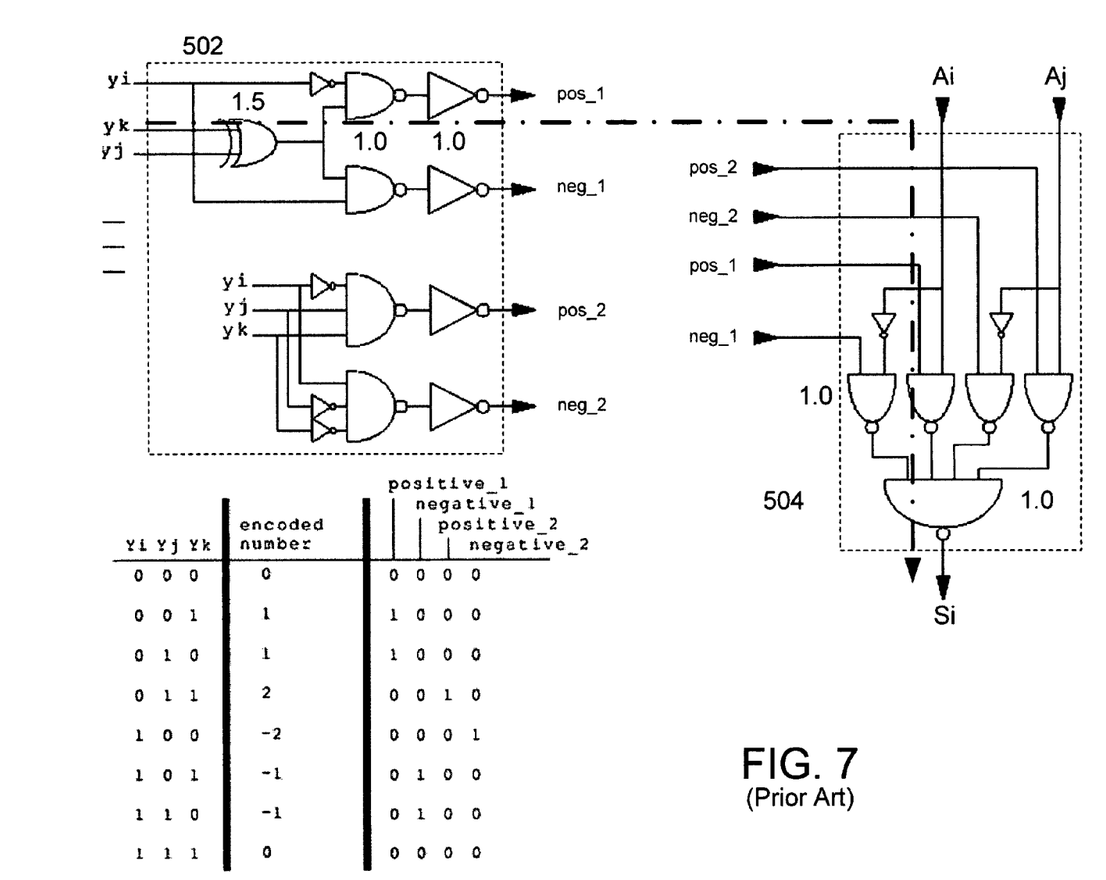
FIG. 7 is a combined detailed circuit diagram and truth table illustrating a still further prior art Booth encoder/selector circuit and signal propagation delays therethrough.

Reference is now made to FIG. 7, which illustrates still another known Booth encoder circuit 502 and selector circuit 504, where the truth table illustrates the detailed circuit operation of the encoder circuit 502. A worst case signal propagation delay through the encoder circuit 502 and the selector circuit 504 is 1.5+1.0+1.0+1.0=5.5.

Figure 8:
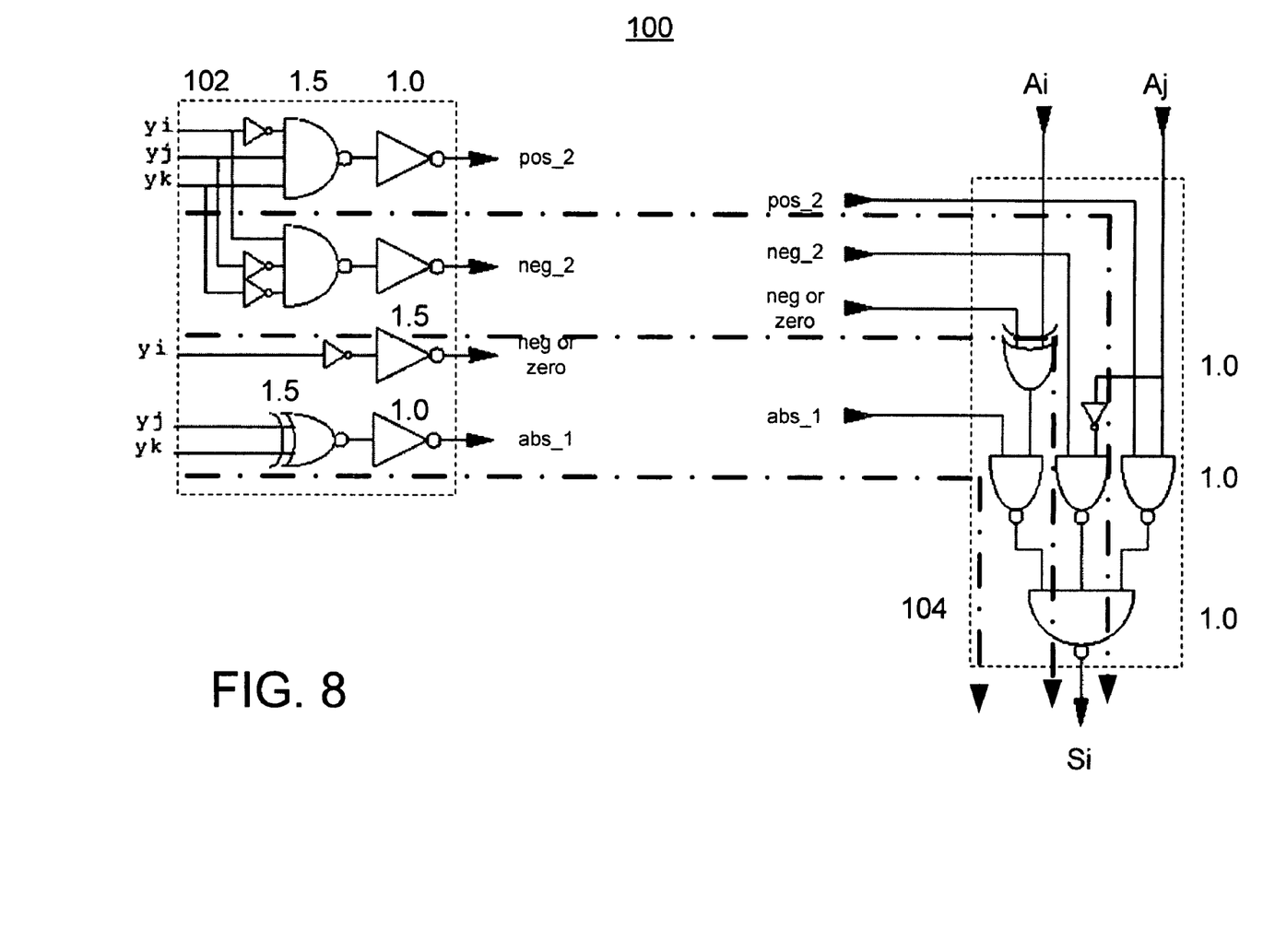
FIG. 8 is a detailed circuit diagram of the encoder/selector circuit of FIGS. 2 and 4 that also shows the signal propagation delays therethrough.

With reference to FIG. 8, which illustrates the encoder circuit 102 and the selector circuit 104 of an embodiment of the present invention, several signal paths are considered. In a first path through the first encoder bit pos_2, the signal propagation delay may be expressed as 1.5+1.0+1.0+1.0=4.5. The signal propagation delay through the second encoder bit path neg_2 may be expressed as 1.5+1.0+1.0+1.0=4.5. The signal propagation delay through the third encoder bit neg or zero may be expressed as 1.5+1.0+1.0+1.0=4.5. In this regard, it is noted that a signal propagation delay of 1.5 was assumed for the inverter in the encoder circuit 102 because that output must be fanned out to a plurality of selector circuits, which increases the signal propagation delay through the inverter. Conversely, a signal propagation delay of 1.0 for the XOR logic gate of the selector circuit 104 was assumed for that path because it has only a single logic gate as a load. The signal propagation delay through the fourth encoder bit abs_1 may be expressed as 1.5+1.0+1.0+1.0=4.5. In comparing the signal propagation delays through the system 100 illustrated in FIG. 8 as compared with the signal propagation delays through the known circuits of FIGS. 5-7, it is noted that the overall signal propagation of the present invention is significantly lower. Further, the signal propagation delays through respective paths through the circuit 100 are relatively balanced as compared with those of the prior art. This leads to faster processing speeds and more highly synchronous operation.

It is noted that the methods and apparatus described thus far and/or described later in this document may be achieved utilizing any of the known technologies, such as standard digital circuitry, analog circuitry, microprocessors, digital signal processors, any of the known processors that are operable to execute software and/or firmware programs, programmable digital devices or systems, programmable array logic devices, or any combination of the above, including devices now available and/or devices which are hereinafter developed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
at least one encoder circuit including a plurality of logic gates operable to convert from radix 2 to radix 4 by receiving a group of bits of a multiplier and producing a set of encoded bits representing numbers of the group consisting of −2, −1, 0, 1, 2, wherein the set of encoded bits includes:
a first bit that is true when the associated number is 2,
a second bit that is true when the associated number is −2,
a third bit that is true when the associated number is either negative or zero, and
a fourth bit that is true when the associated number has an absolute value of 1; and
a plurality of selector circuits, each operable to:
(i) receive the encoded bits from the at least one encoder and a respective group of bits of the multiplicand, and
(ii) produce a respective bit of a partial product wherein:
each selector circuit is operable to receive a respective group of two bits of the multiplicand, Ai, Aj to produce the respective bit of a partial product, and each selector circuit includes a plurality of logic gates that are operable to produce an output bit, Si, in accordance with the following Boolean expression: Si=(B1 !AND Aj) !AND (B2 !AND Aj) !AND (B4 !AND (B3 XOR Ai)).

2. The apparatus of claim 1, wherein the encoder circuit includes:
a first circuit operable to receive three bits of the multiplier, yi, yj, yk and to produce the first bit of the set of encoded bits;
a second circuit operable to receive the yi, yj, yk bits and to produce the second bit of the set of encoded bits;
a third circuit operable to receive the yi bit and to produce the third bit of the set of encoded bits; and
a fourth circuit operable to receive the yj, yk bits and to produce the fourth bit of the set of encoded bits.

3. The apparatus of claim 2, wherein the first circuit includes one or more logic gates that operate in accordance with the following truth table:

| yi | yj | yk | first bit |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 0. |

4. The apparatus of claim 2, wherein the second circuit includes one or more logic gates that operate in accordance with the following truth table:

| yi | yj | yk | second bit |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0. |

5. The apparatus of claim 2, wherein the third circuit includes one or more logic gates that operate in accordance with the following truth table:

| yi | yj | yk | third bit |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 1. |

6. The apparatus of claim 2, wherein the fourth circuit includes one or more logic gates that operate in accordance with the following truth table:

| yi | yj | yk | fourth bit |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 0 |
| 1 | 0 | 1 | 1 |
| 1 | 1 | 0 | 1 |
| 1 | 1 | 1 | 0. |

7. The apparatus of claim 1, further comprising N/2 encoder circuits, where N is a number of bits in the multiplier, and each encoder circuit is operable to receive a different group of three bits of the multiplier, except for a last one of the encoders which receives a group of two bits of the multiplier and a null bit.

8. The apparatus of claim 7, wherein:
the multiplier includes bits y0, y1, y2, y3, . . . yN−1;
a first of the encoders receives bits y0, y1, y2;
a second of the encoders receives bits y2, y3, y4; and
any further of the encoders receives bits in accordance with the pattern established by the above convention.

9. An apparatus, comprising:
at least one selector circuit operable to: (i) receive respective groups of encoded bits of a multiplier and a respective group of bits of a multiplicand; and (ii) produce a respective bit of a partial product,
wherein the encoded bits represent a radix 4 conversion of radix 2 numbers, the radix 4numbers being a group consisting of −2, −1, 0, 1, 2, and the set of encoded bits includes:
a first bit that is true when the associated number is 2,
a second bit that is true when the associated number is −2,
a third bit that is true when the associated number is either negative or zero, and
a fourth bit that is true when the associated number has an absolute value of 1;
the at least one selector circuit is operable to receive a respective group of two bits of the multiplicand, Ai, Aj to produce the respective bit of a partial product; and
the at least one selector circuit includes a plurality of logic gates that are operable to produce an output bit, Si, in accordance with the following Boolean expression: Si= (B1 !AND Aj) !AND (B2 !AND Aj) !AND (B4 !AND (B3 XOR Ai)), where Bi are the first, second, third and fourth encoded bits.

10. The apparatus of claim 9, further comprising N selector circuits, where N is a number of bits in the multiplicand, and each selector circuit is operable to receive a different group of two bits of the multiplicand, except for a last one of the selector circuits which receives one bit of the multiplicand and a null bit.

11. The apparatus of claim 10, wherein:
the multiplicand includes bits A0, A1, A2, A3, . . . AN−1;
a first of the selector circuits receives bits A0, A1;
a second of the selector circuits receives bits A1, A2;
a third of the selector circuits receives bits A2, A3; and
any further of the selector circuits receives bits in accordance with the pattern established by the above convention.

12. The apparatus of claim 11, wherein:
an aggregate of the output bits Si for a given group of encoded bits is a partial product of a product of the multiplier and the multiplicand; and a sum of the partial products is the product of the multiplier and the multiplicand.

13. A method, comprising:
utilizing at least a processor for converting a set of radix 2 encoded bits of a multiplier to respective groups of radix 4 encoded bits representing numbers of the group consisting of −2, −1, 0, 1, 2,
wherein the set of encoded bits includes:
a first bit that is true when the associated number is 2,
a second bit that is true when the associated number is −2,
a third bit that is true when the associated number is either negative or zero, and
a fourth bit that is true when the associated number has an absolute value of 1;
receiving a respective group of two bits of the multiplicand, Ai, Aj and a respective group of encoded bits, Bi; and
producing a bit, Si, of a partial product in accordance with the following Boolean expression:
Si=(B1 !AND Aj) !AND (B2 !AND Aj) !AND (B4 !AND (B3 XOR Ai)).

14. The method of claim 13, further comprising producing the first, second, third and fourth bits in accordance with the following truth table:

| yi | yj | yk | 1$^{st}$ bit | 2$^{nd}$ bit | 3$^{rd}$ bit | 4$^{th}$ bit |
|---|---|---|---|---|---|---|
| 0 | 0 | 0 | 0 | 0 | 0 | 0 |
| 0 | 0 | 1 | 0 | 0 | 0 | 1 |
| 0 | 1 | 0 | 0 | 0 | 0 | 1 |
| 0 | 1 | 1 | 1 | 0 | 0 | 0 |
| 1 | 0 | 0 | 0 | 1 | 1 | 0 |
| 1 | 0 | 1 | 0 | 0 | 1 | 1 |
| 1 | 1 | 0 | 0 | 0 | 1 | 1 |
| 1 | 1 | 1 | 0 | 0 | 1 | 0. |

15. The method of claim 14, further comprising converting respective groups of three bits of the multiplier into the encoded bits, except for a last one of the groups which receives includes two bits of the multiplier and a null bit, wherein:
the multiplier includes bits y0, y1, y2, y3, . . . yN−1;
a first group of three bits of the multiplier includes y0, y1, y2;
a second group of three bits of the multiplier includes y2, y3, y4; and
any further groups of three bits of the multiplier includes bits in accordance with the pattern established by the above convention.

16. The method of claim 13, further comprising: receiving a respective group of encoded bits and a respective group of bits of the multiplicand; and producing a respective bit of a partial product.

17. The method of claim 13, wherein:
the multiplicand includes bits A0, A1, A2, A3, . . . AN−1;
a first group of two bits of the multiplicand consists of bits A0, A1;
a second group of two bits of the multiplicand consists of bits A1, A2;
a third group of two bits of the multiplicand consists of bits A2, A3; and
any further groups of two bits of the multiplicand consists of bits in accordance with the pattern established by the above convention.

18. The method of claim 17, further comprising assembling an aggregate of the bits Si for a given group of encoded bits to produce a partial product of a product of the multiplier and the multiplicand.

19. The method of claim 18, further comprising summing the partial products to produce the product of the multiplier and the multiplicand.

* * * * *